United States Patent
Li et al.

(10) Patent No.: US 12,238,564 B2
(45) Date of Patent: Feb. 25, 2025

(54) RRM MEASUREMENT RESTRICTION ON CLI MEASUREMENT

(71) Applicant: Apple Inc., Cupertino, CA (US)

(72) Inventors: Qiming Li, Beijing (CN); Jie Cui, San Jose, CA (US); Yang Tang, San Jose, CA (US); Hua Li, Beijing (CN); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/369,097

(22) Filed: Sep. 15, 2023

(65) Prior Publication Data

US 2024/0007892 A1 Jan. 4, 2024

Related U.S. Application Data

(63) Continuation of application No. 17/439,767, filed as application No. PCT/US2020/037532 on Jun. 12, 2020.

(Continued)

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04B 17/336* (2015.01); *H04L 5/0051* (2013.01)

(58) Field of Classification Search
CPC . H04W 24/10; H04W 24/08; H04W 56/0005; H04W 56/001; H04W 56/004;
(Continued)

(56) References Cited

U.S. PATENT DOCUMENTS

2018/0323916 A1 11/2018 Yang et al.
2020/0112420 A1* 4/2020 Xu ..................... H04L 5/0073
(Continued)

FOREIGN PATENT DOCUMENTS

CN 108631969 10/2018
CN 108777608 11/2018
(Continued)

OTHER PUBLICATIONS

Ericsson, "On scheduling restrictions for SRS-RSRP and CLI-RSSI measurements," 3GPP TSG RAN WG4 Meeting #92, R4-1909601, Ljubljana, Slovenia, Aug. 26-30, 2019, 2 pages.
(Continued)

*Primary Examiner* — Awet Haile
(74) *Attorney, Agent, or Firm* — Fish & Richardson P.C.

(57) ABSTRACT

Disclosed are methods, systems, apparatus, and computer programs for a coordination mechanism between a network and a user equipment (UE) that is configured to perform cross-link interference (CLI) measurements. In one aspect, a method includes generating a message that indicates a capability of a user equipment (UE) whether to support simultaneous reception of at least one signal associated with cross-link interference (CLI) measurement and at least one signal associated with a serving cell or a neighbor cell of the UE. The method further includes transmitting the message to an access node (AN).

25 Claims, 11 Drawing Sheets

Related U.S. Application Data

(60) Provisional application No. 62/861,064, filed on Jun. 13, 2019.

(51) Int. Cl.
   *H04B 17/336* (2015.01)
   *H04L 5/00* (2006.01)

(58) Field of Classification Search
   CPC . H04W 72/541; H04W 92/18; H04W 72/542; H04L 5/0048; H04L 5/0051; H04L 5/0057
   See application file for complete search history.

(56) References Cited

U.S. PATENT DOCUMENTS

| | | | |
|---|---|---|---|
| 2020/0337057 A1* | 10/2020 | Abedini | H04B 7/0617 |
| 2022/0006501 A1 | 1/2022 | Kim et al. | |
| 2022/0022073 A1 | 1/2022 | Zhang et al. | |
| 2022/0060265 A1 | 2/2022 | Xu et al. | |
| 2022/0095144 A1* | 3/2022 | Ren | H04W 24/10 |
| 2022/0124533 A1 | 4/2022 | Li et al. | |
| 2022/0159596 A1* | 5/2022 | Kim | H04B 17/336 |
| 2022/0191724 A1* | 6/2022 | Hwang | H04L 5/0051 |

FOREIGN PATENT DOCUMENTS

| | | |
|---|---|---|
| CN | 109804575 | 5/2019 |
| WO | WO 2018/219099 | 12/2018 |
| WO | WO 2018/228583 | 12/2018 |

OTHER PUBLICATIONS

International Preliminary Report on Patentability in International Appln. No. PCT/US2020/037532, dated Dec. 23, 2021, 9 pages.
International Search Report and Written Opinion in International Appln. No. PCT/US2020/037532, dated Sep. 24, 2020, 17 pages.
LG Electronics, "WF on CLI measurement," 3GPP TSG-RAN WG4 Meeting #91, R4-1907385, Reno, US, May 13-17, 2019, 8 pages.
Qualcomm Incorporated, "CLI-RSSI and SRS-RSRP Measurement," 3GPP TSG-RAN WG2, Meeting #106, R2-1906109, Reno, Nevada USA, May 13-17, 2019, 11 pages.
Qualcomm, Inc. "Discussion on UE features for CLI," 3GPP TSG RAN WG1 #101, R1-2004486, e-Meeting, May 25-Jun. 5, 2020, 8 pages.
LG Electronics, "Discussion on CLI measurement," 3GPP TSG-RAN WG4 Meeting #91, R4-1906038, Reno, Nevada USA, May 13-17, 2019, 2 pages.
LG Electronics, "Discussion on CLI measurement for duplexing flexibility," 3GPP TSG RAN WG1 Meeting #89, R1-1707678, Hangzhou, P.R. China, May 15-19, 2017, 6 pages.

* cited by examiner

RRM MEASUREMENT RESTRICTION ON CLI MEASUREMENT

CLAIM OF PRIORITY

This application is a continuation of and claims priority to U.S. patent application Ser. No. 17/439,767, filed Sep. 15, 2021, which is a U.S. National Phase application under 35 U.S.C. § 371 of International Patent Application No. PCT/US2020/037532, filed Jun. 12, 2020, which claims priority to U.S. Provisional Patent Application No. 62/861,064 filed Jun. 13, 2019, entitled "RRM MEASUREMENT RESTRICTION ON CLI MEASUREMENT," the entire contents of each of which are incorporated herein by reference.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for a coordination mechanism between a network and a user equipment (UE) that is configured to perform cross-link interference (CLI) measurements.

In accordance with one aspect of the present disclosure, a method includes generating a message that indicates a capability of a user equipment (UE) whether to support simultaneous reception of at least one signal associated with cross-link interference (CLI) measurement and at least one signal associated with a serving cell or a neighbor cell of the UE. The method further includes transmitting the message to an access node (AN).

Other versions include corresponding systems, apparatus, and computer programs to perform the actions of methods defined by instructions encoded on computer readable storage devices. These and other versions may optionally include one or more of the following features In some embodiments, the method further involves receiving one or more signals associated with the CLI measurement during a CLI measurement window.

In some embodiments, the CLI measurement window is from X1 symbols before a CLI measurement related symbol to X2 symbols after the CLI measurement related symbol, and wherein X1 and X2 are integers greater than or equal to 0, and wherein the CLI measurement related symbol includes at least one orthogonal frequency-division multiplexing (OFDM) symbol of a sound reference signal (SRS).

In some embodiments, X1 and X2 are determined based at least one of the UE capability or subcarrier spacing (SCS).

In some embodiments, the UE capability indicates that the UE supports the simultaneous reception of the at least one signal associated with the CLI measurement and the at least one signal associated with the serving cell or the neighbor cell of the UE, and the method further includes receiving, during a CLI measurement window, one or more sound reference signals (SRSs) associated with the CLI measurement; performing, during the CLI measurement window, one or more measurements with respect to the one or more SRSs; and receiving, during the CLI measurement window, one or more signals associated with the serving cell or the neighbor cell of the UE.

In some embodiments, the one or more measurements include at least one of a reference signal received power (RSRP) measurement and a received signal strength indicator (RSSI) measurement with respect to the one or more SRSs.

In some embodiments, the one or more signals associated with the serving cell or the neighbor cell of the UE is at least one radio resource management (RRM) signal.

In some embodiments, the one or more signals associated with the serving cell of the UE includes at least one of a physical downlink shared channel (PDSCH) signal and a physical downlink control channel (PDCCH) signal.

In some embodiments, the UE capability indicates that the UE does not support the simultaneous reception of the at least one signal associated with the CLI measurement and the at least one signal associated with the serving cell or neighbor cell of the UE, and the method further includes: receiving, during a CLI measurement window, one or more sound reference signals (SRSs) associated with the CLI measurement; performing, during the CLI measurement window, one or more measurements with respect to the one or more SRSs; and disregarding, during the CLI measurement window, one or more signals that are associated with the serving cell or the neighbor cell of the UE and that are transmitted to the UE.

In accordance with another aspect of the present disclosure, an apparatus of a user equipment (UE), includes processing circuitry configured to determine a capability of the UE indicating whether the UE supports simultaneous cross-link interference (CLI) measurement and at least one signal associated with a serving cell or a neighbor cell of the UE; and baseband circuitry coupled with the processing circuitry, the baseband circuitry configured to generate a message that indicates the capability of the UE.

In some embodiments, the processing circuitry is further configured to: perform the CLI measurement during a CLI measurement window.

In some embodiments, the CLI measurement window is from X1 symbols before a CLI measurement related symbol to X2 symbols after the CLI measurement related symbol, and wherein X1 and X2 are integers greater than or equal to 0, and wherein the CLI measurement related symbol includes at least one orthogonal frequency-division multiplexing (OFDM) symbol of a sound reference signal (SRS).

In some embodiments, the UE capability indicates that the UE is capable of simultaneous CLI measurement and reception of the at least one signal associated with the serving cell or the neighbor cell of the UE, and the baseband circuitry is further configured to: perform, during a CLI measurement window, one or more measurements with respect to one or more sound reference signals (SRSs) associated with the CLI measurement; and receive, during the CLI measurement window, one or more signals associated with the serving cell or the neighbor cell of the UE.

In some embodiments, the UE capability indicates that the UE is not capable of simultaneous CLI measurement and reception of the at least one signal associated with the serving cell or the neighbor cell of the UE, and the baseband circuitry is further configured to: perform, during a CLI measurement window, one or more measurements with respect to one or more sound reference signals (SRSs) associated with the CLI measurement; and disregard, during the CLI measurement window, one or more signals that are associated with the serving cell or the neighbor cell of the UE and that are transmitted to the UE.

In accordance with yet another aspect of the present disclosure, a method involves receiving from a user equipment (UE) a message that indicates a capability of the UE whether to support simultaneous cross-link interference (CLI) measurement and reception of at least one signal associated with a serving cell of the UE. The method further involves determining, based on the message, whether the UE supports simultaneous CLI measurement and reception of the at least one signal associated with the serving cell of the UE.

In some embodiments, determining, based on the message, whether the UE supports simultaneous CLI measurement and reception of the at least one signal associated with the serving cell of the UE comprises determining that the UE does not support simultaneous CLI measurement and reception of the at least one signal associated with the serving cell of the UE, and the method further involves: determining that the UE is to disregard one or more signals that are associated with the serving cell and that are transmitted to the UE.

In some embodiments, the method further involves receiving from the UE a report indicative of one or more measurements with respect to one or more sound reference signals (SRSs) associated with the CLI measurement.

In some embodiments, determining, based on the message, whether the UE supports simultaneous CLI measurement and reception of the at least one signal associated with the serving cell of the UE comprises determining that the UE supports simultaneous CLI measurement and reception of the at least one signal associated with the serving cell of the UE, and the method further includes receiving from the UE a report indicative of: (i) one or more measurements with respect to one or more sound reference signals (SRSs) associated with the CLI measurement, and (ii) one or more measurements with respect to one or more signals associated with the serving cell of the UE.

In some embodiments, the one or more measurements with respect to the one or more signals associated with the serving cell of the UE are at least one of synchronization signal block (SSB) or channel state information reference signal (CSI-RS) based measurements.

In some embodiments, the one or more measurements with respect to the one or more SRSs associated with the CLI measurement include at least one of a reference signal received power (RSRP) measurement and a received signal strength indicator (RSSI) measurement with respect to the one or more SRSs.

DESCRIPTION OF DRAWINGS

Like reference numbers and designations in the various drawings indicate like elements.

DETAILED DESCRIPTION

The present disclosure is related to a network coordination mechanism that coordinates between a network and a user equipment (UE) that is configured to perform cross-link interference (CLI) measurements. In one embodiment, the coordination mechanism includes an indicator that enables a UE to communicate to the network the UE's capability for simultaneous reception of at least one signal associated with a CLI measurement and at least one signal associated with a serving cell or a neighbor cell of the UE. In another embodiment, the coordination mechanism includes an indicator that enables the UE to communicate to the network the UE's capability for simultaneous CLI measurements and measurements of at least one signal associated with a serving cell of the UE. In yet another embodiment, the coordination mechanism includes measurement restrictions that restrict the measurement that the UE is to perform at a particular time to avoid conflicting measurements. Among other advantages, the disclosed coordination mechanism improve connection quality of UEs (e.g., by improving user throughput).

Figure 1:
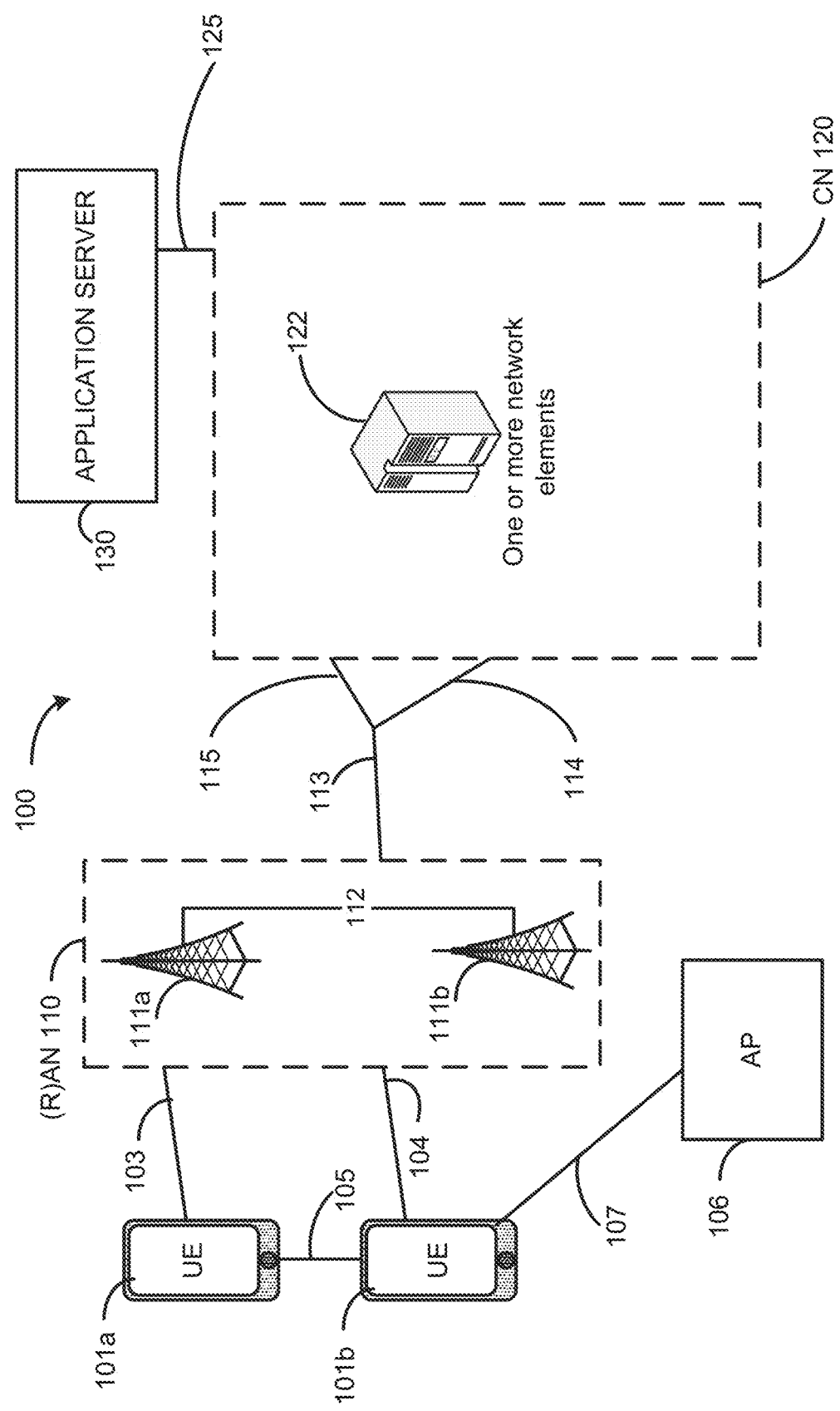
FIG. 1 illustrates an example architecture of a system of a network, according to some embodiments of the present disclosure.

FIG. 1 illustrates an example architecture of a system 100 of a network, in accordance with various embodiments. The following description is provided for an example system 100 that operates in conjunction with the LTE system standards and/or 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE/NR and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. According to various embodiments, the RAN nodes 111 may operate in a licensed and/or an unlicensed frequency spectrum. More specifically, NR in unlicensed spectrum may be referred to as NR-U, and LTE in an unlicensed spectrum may be referred to as LTE-U, licensed assisted access (LAA), or MulteFire. As such, the RAN nodes 111 may operate using LTE, advanced long term evolution (LTE-A) LTE-A, LTE-U, 5G, NR, and/or NR-U protocols.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some embodiments, an individual RAN node 111 may represent individual gNB-DUs that are connected to a gNB-CU via individual F1 interfaces (not shown by FIG. 1). In these embodiments, the gNB-DUs may include one or more remote radio heads or RFEMs (see, e.g., FIG. 6), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC via an NG interface.

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these embodiments, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some embodiments, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an NR or NR involved system (e.g., when CN 120 is an EPC 420 as in FIG. 4), the interface 112 may be an X2 interface 112. The X2 interface may be defined between two or more RAN nodes 111 (e.g., two or more eNBs and the like) that connect to EPC 120, and/or between two eNBs connecting to EPC 120. In some embodiments, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some embodiments, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other embodiments, the Xn-U protocol stack and/or the Xn-C protocol stack may be same or similar to the user plane and/or control plane protocol stack(s) shown and described herein.

The RAN 110 is shown to be communicatively coupled to a core network-in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable embodiments of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

In some scenarios, signal interference may occur between UEs, such as UEs 101a, 101b. In one scenario, interference may occur when the wireless connections of the UEs with their respective access nodes have different transmission directions. In this scenario, an uplink transmission of one UE may interfere with a downlink reception of another UE. This scenario may occur, for example, when the UEs are served by access nodes that implement dynamic time division duplex (TDD) and/or when the UEs are in proximity of one another (e.g., the UEs are less than a threshold distance from one another). This UE-UE interference is also referred to as cross-link interference (CLI). The CLI may occur to the UE with DL reception when a proximate UE is transmitting UL signals using the same or sufficient close frequencies at the same time. In some other scenarios, it may occur in frequency division duplex (FDD) if the frequencies used by the two UEs are sufficiently close.

Figure 2:
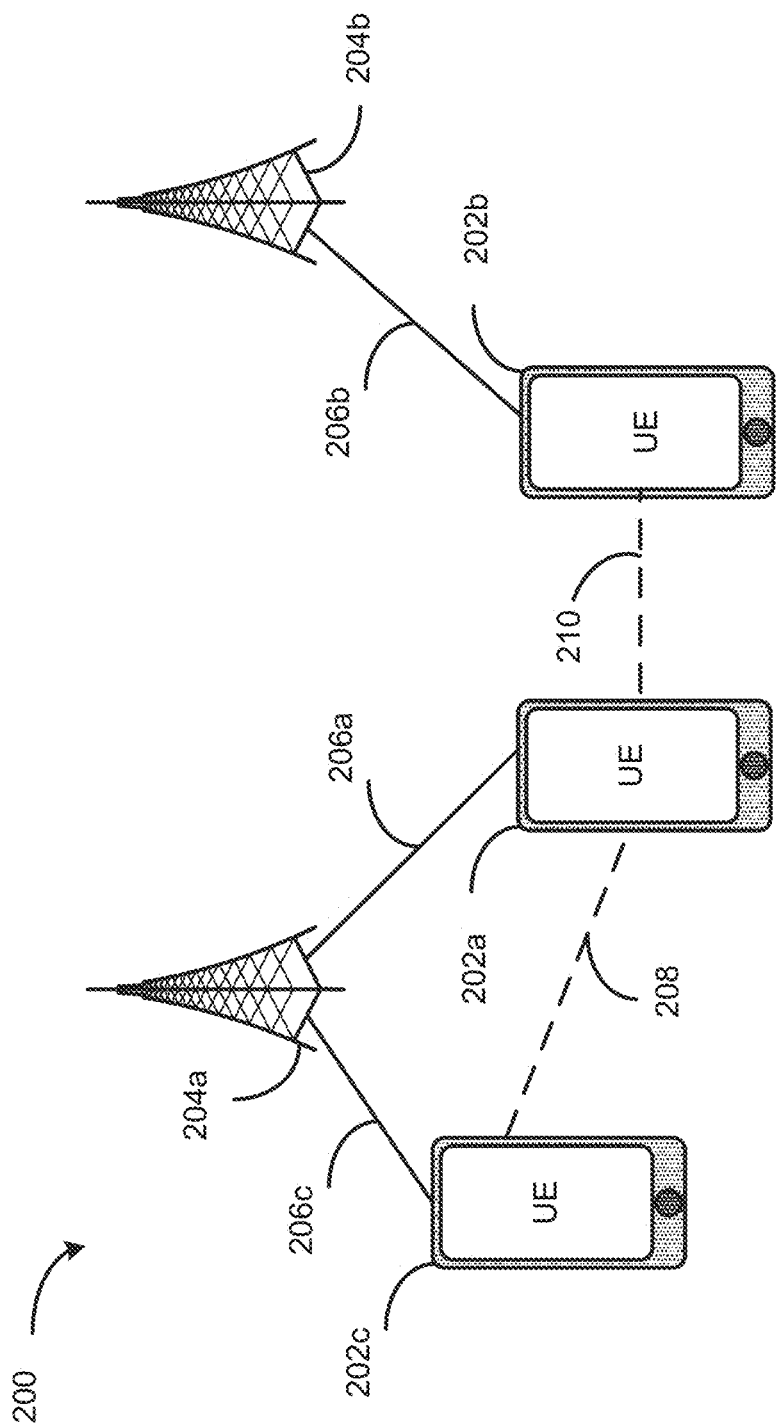
FIG. 2 illustrates an example of cross-link interference, according to some embodiments of the present disclosure.

FIG. 2 illustrates an example 200 of cross-link interference, according to some embodiments. In example 200, UEs 202a, 202c are served by access node (AN) 204a via connections 206a, 206c, respectively. And UE 202b is served by access node 204b via connection 206b. The UEs 202a, 202b, 202c (referred to collectively as "UEs 202") may be the same as or substantially similar to UEs 101 of FIG. 1. ANs 204a, 204b (collectively referred to as "ANs 204") may be the same as or substantially similar to RAN nodes 111 of FIG. 1. More specifically, the ANs 204a, 204b may each be a base station (BS), evolved NodeB (eNB), next generation NodeB (gNB), road side unit (RSU), transmission reception point (TRxP or TR), and so forth, and can include ground stations (e.g., terrestrial access points) or satellite stations providing coverage within a geographic area (e.g., a cell).

In example 200, CLI may occur between two or more of the UEs 202. As shown in FIG. 2, UE 202a is in proximity of UE 202b and UE 202c. As such, CLI may occur between UE 202a and UE 202b, and/or between UE 202a and UE 202c. In one example, the CLI may occur when the wireless connections of the UEs (e.g., UE 202a and UE 202b) have different transmission directions. The CLI between UE 202a and UE 202b is represented by dashed line 210, and the CLI between UE 202a and UE 202c is represented by dashed line 208. Among other issues, the CLI between UEs 202 may impact user throughput.

In order to improve connection quality (e.g., by improving user throughput), a network may seek to mitigate CLI between UEs. CLI mitigation techniques include coordinated scheduling/beamforming, power control, link adaptation, hybrid dynamic/static UL/DL resource assignment, among other examples. To use the CLI mitigation techniques to mitigate the CLI affecting a UE, the network may first obtain interference information of the UE.

In one approach, the network obtains the interference information by instructing the UE (referred to as a "measuring UE") to perform a CLI measurement and to report the measurement to the network. CLI measurements are introduced in 3GPP Release 16. According to current designs, CLI measurements are based on one or more uplink signals that are received by a measuring UE from one or more interfering UEs (also referred to as "aggressive UEs"). The one or more uplink signals are, for example, sounding reference signals (SRS). The CLI measurements of the one or more uplink signals may include reference signal received power (CLI-RSRP) and/or received signal strength indicator (CLI-RSSI).

When performing a CLI measurement, although the propagation delay from different interfering UEs may be different, the measuring UE may assume a fixed arrival timing of the uplink signal (e.g., to reduce UE complexity). Because uplink signals received from interfering UEs may be configured by different ANs, these signals may arrive at or near the same time as signals that are associated with a serving cell of the UE (e.g., received from the access node serving the UE) or a neighbor cell of the UE. If the signals arrive at or near the same time and the UE does not have the capability of receiving (or measuring) the signals simultaneously, then receiving (or measuring) at least one of the signals may fail.

To illustrate this scenario, consider a measuring UE that seeks to perform a CLI measurement of an SRS signal received from an interfering UE. At or near the same time that the UE is to perform the CLI measurement, the UE may also receive one or more signals used for Radio Resource Management (RRM) measurements from the measuring UE's network. The RRM measurements may be synchronization signal block (SSB) and/or a channel state information reference signal (CSI-RS) based measurements for radio link monitoring, beam failure detection, candidate beam detection, Layer 1-RSRP, and/or Layer 3-RSRP (RLM/BFD/CBD/L1-RSRP/L3-RSRP). If the measuring UE does not have the capability to simultaneously perform the CLI and the RRM measurements (or to simultaneously receive the signals associated with the measurements), then the CLI measurement and/or the RRM measurement may fail.

In order to avoid failure of one or both of these measurements, disclosed herein are UE capabilities that enable a UE to indicate whether the UE can perform certain actions concurrently with a CLI measurement or reception of a signal associated with a CLI measurement. These UE capabilities may be provided to a network by the UE and may be used by the network as a coordination mechanism between signals from the network and CLI measurements at the UE. In an embodiment, a UE capability indicates whether a UE can support simultaneous CLI and RRM measurements. The RRM measurements may be SSB and/or CSI-RS based measurements for RLM/BFD/CBD/L1-RSRP/L3-RSRP. In another embodiment, a UE capability indicates whether a UE can support simultaneous CLI measurement and physical downlink shared channel (PDSCH) and/or physical downlink control channel (PDCCH) reception. A UE that has this capability not only can support CLI and RRM measurements concurrently, but also concurrent PDSCH/PDCCH reception.

In an embodiment, a UE may indicate the UE capability to a network by way of an information element (IE). Table 1 includes two example IEs that can be used to indicate UE capabilities. As shown in Table 1, the IE simultaneousRxDataAndMeasCLI indicates whether the UE supports concurrent CLI measurement from a non-serving cell and reception of PDCCH or PDSCH from the serving cell. Further, the IE simultaneousMeasRRMAndMeasCLI indicates whether the UE supports concurrent CLI measurement from a non-serving cell and measurement on SSB or CSI-RS from the serving cell. Note that the identifiers of the IEs in Table 1 are examples only and that IEs that indicate the same information may have different identifiers.

TABLE 1

| Definitions for parameters | Per | M | FDD TDD DIFF | FR1 FR2 DIFF |
|---|---|---|---|---|
| simultaneousRxDataAndMeasCLI Indicates whether the UE supports concurrent CLI measurement from non-serving cell and reception of PDCCH or PDSCH from the serving cell. | BC | No | Yes | Yes |
| simultaneousMeasRRMAndMeasCLI Indicates whether the UE supports concurrent CLI measurement from non-serving cell and measurement on SSB or CSI-RS from the serving cell. | BC | No | Yes | Yes |

In an embodiment, after receipt of an IE that indicates a UE capability, a network may determine a capability of the UE associated with the received IE. In an example, if the UE capability indicates that a UE can perform certain actions concurrently with a CLI measurement or reception of a signal associated with the CLI measurement, then the network may determine not restrict UE processes (e.g., measurements and/or signal reception). As such, depending on the UE capability, the UE may concurrently perform a CLI measurement (or receipt of an associated signal), an RRM measurement (or receipt of an associated signal), and/or PDSCH/PDCCH reception. However, if the UE capability indicates that the UE does not support performing certain actions concurrently with a CLI measurement or reception of a signal associated with a CLI measurement, then the network may responsively take a remedial action that avoids collision of the signals or failure of the measurements.

In an embodiment, the network may implement a measurement restriction on a UE in response to determining that the UE does not support a particular capability (e.g., the UE does not support performing certain actions concurrently with a CLI measurement or reception of a signal associated with a CLI measurement). Under the measurement restriction, the network may not expect the UE to perform particular measurements. In an example, under one measurement restriction, the UE is not expected to perform SSB based or CSI-RS based RRM measurements for RLM/BFD/CBD/L1-RSRP/L3-RSRP during a CLI measurement window. In another example, under another measurement restriction, the UE is not expected to perform a CLI measurement if there is an SSB or CSI-RS configured for RLM/BFD/CBD/L1-RSRP/L3-RSRP within a CLI measurement window. If a measurement restriction is implemented, a longer evaluation for a CLI or RRM measurement can be expected, or UE may simply drop or disregard the CLI or RRM measurement.

The CLI measurement window may be determined by the UE based on the assumption of a fixed arrival timing of the uplink signal (as described above). In an example, the CLI measurement window may start from X1 symbols before a CLI measurement related symbol (e.g., an one orthogonal frequency-division multiplexing (OFDM) symbol of a reference signal) to X2 symbols after the CLI measurement related symbol, where X1 and X2 are integers equal to or greater than 0. The values of X1 and X2 may depend on UE capability, subcarrier spacing (SCS), and/or frequency bands (e.g., Frequency Range 1 (FR1) and Frequency Range 2 (FR2). In NR, FR1 overlaps and extends 4G LTE frequencies, including various bands from 450 MHz to 6,000 MHz, which is also referred to as NR sub-6 GHz. And FR2 covers from 24,250 MHz to 52,600 MHz, which is commonly referred to as mmWave, even though the millimeter wave frequency may start at 30 GHz strictly speaking.

For example, for a UE that does not support simultaneous CLI and RRM measurements, the UE may be restricted from receiving PDCCH/PDSCH/CSI-RS within the CLI measurement window (e.g., OFDM symbols on which the UE performs SRS-RSRP measurements). The CLI measurement window may include 1 data symbol before an OFDM symbol used for SRS-RSRP measurements for 15 kiloHertz (kHz) and kHz subcarrier spacing, and may include 2 data symbols before an OFDM symbol used for SRS-RSRP measurements for 60 kHz subcarrier spacing.

Figure 3A:
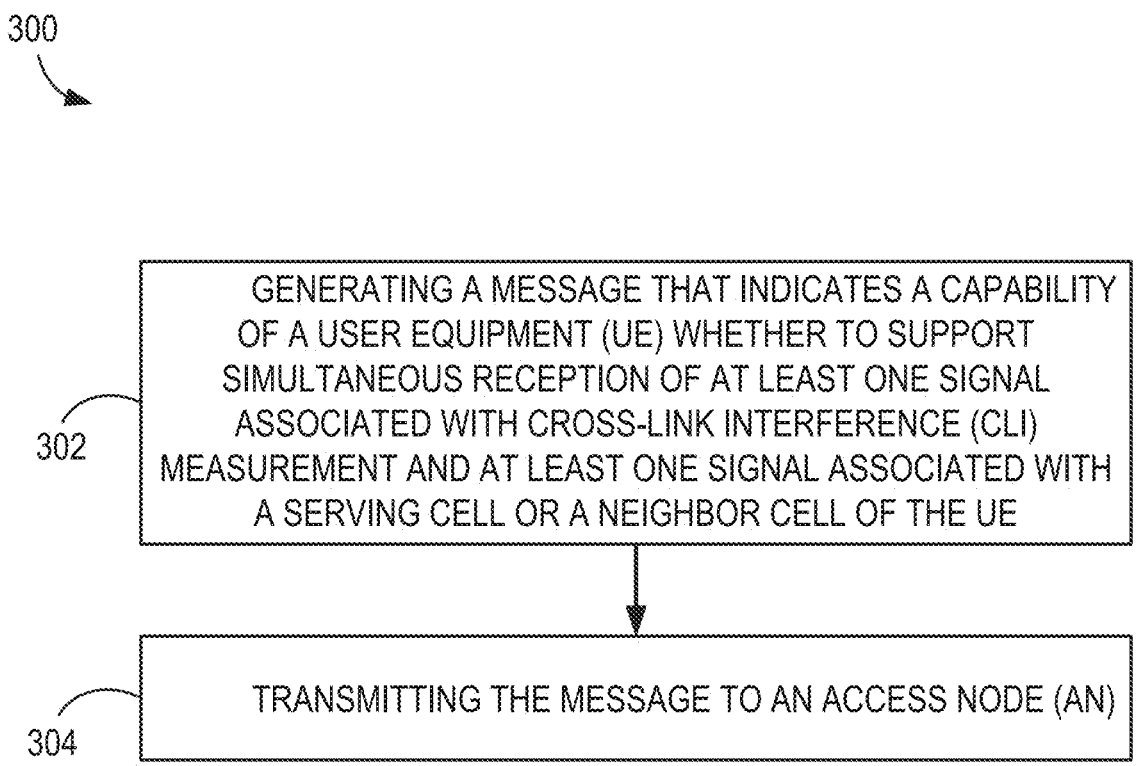
FIGS. 3A, 3B, and 3C each illustrate a flowchart of an example process, according to some embodiments of the present disclosure.
Figure 3B:
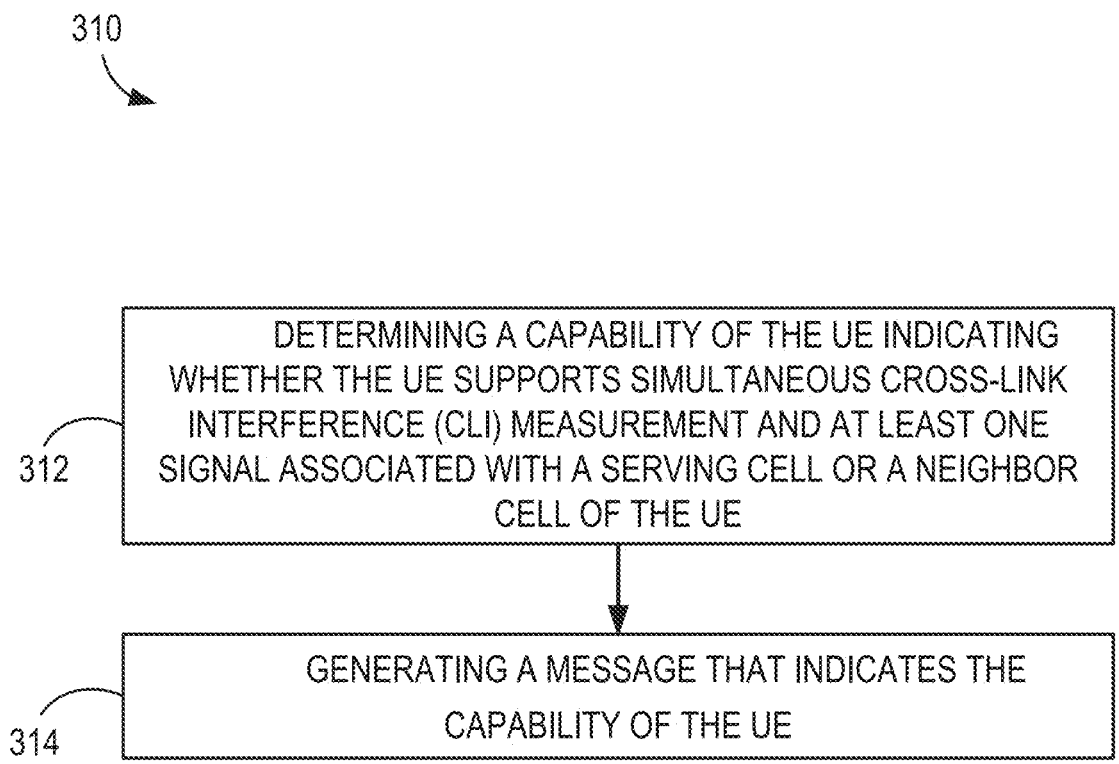
Figure 3C:
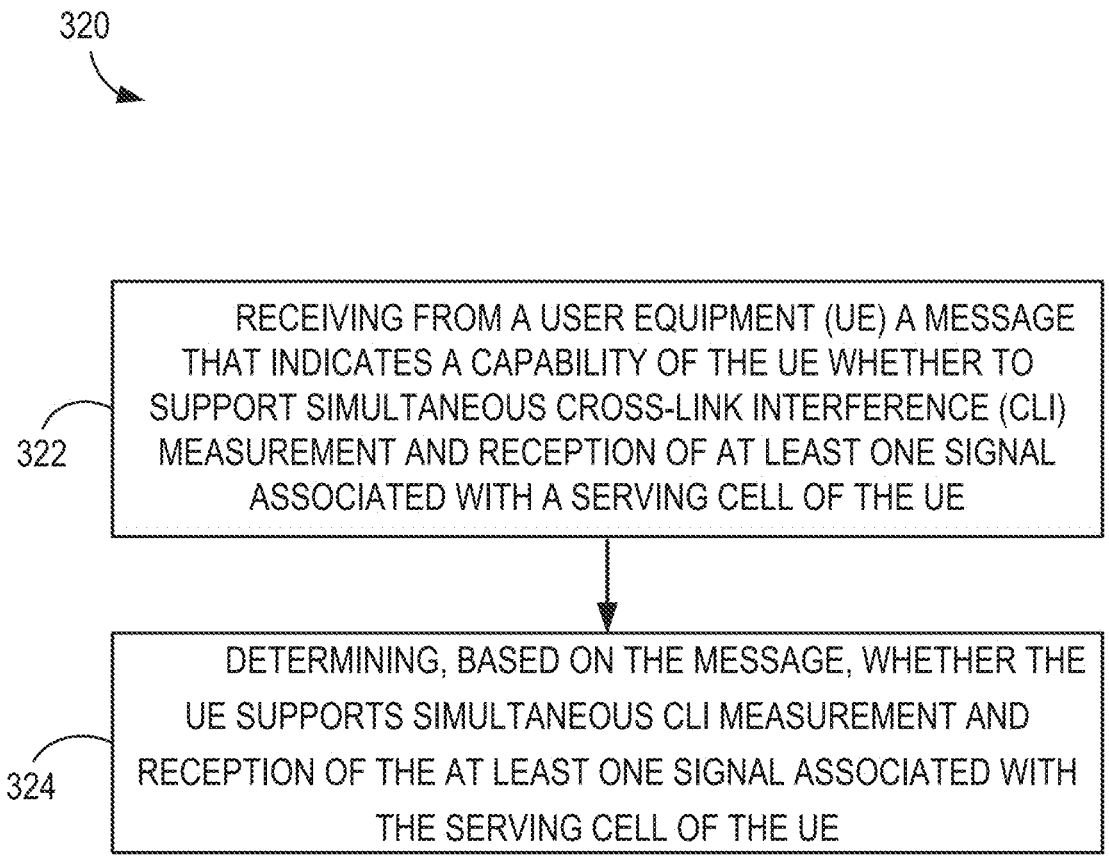

FIGS. 3A, 3B, and 3C each illustrate a flowchart of an example process, according to some embodiments. For clarity of presentation, the description that follows generally describes the processes in the context of the other figures in this description. As an example, flowcharts 300, 310 may be performed by a UE (e.g., as shown in FIG. 1 or FIG. 2) and flowchart 320 may be performed by an access node (e.g., as shown in FIG. 2). However, it will be understood that the processes may be performed, for example, by any suitable system, environment, software, and hardware, or a combination of systems, environments, software, and hardware, as appropriate. In some embodiments, various steps of the processes can be run in parallel, in combination, in loops, or in any order.

FIG. 3A is a flowchart of an example process 300 for indicating a UE capability from UE's perspective, in accordance with various embodiments. This UE may be the same as or substantially similar to the UEs 101 and/or 202. At step 302, the process 300 involves generating a message that indicates a capability of a user equipment (UE) whether to support simultaneous reception of at least one signal associated with cross-link interference (CLI) measurement and at least one signal associated with a serving cell or a neighbor cell of the UE. At step 304, the process 300 involves transmitting the message to an access node (AN).

In some embodiments, the method further involves receiving one or more signals associated with the CLI measurement during a CLI measurement window.

In some embodiments, the CLI measurement window is from X1 symbols before a CLI measurement related symbol to X2 symbols after the CLI measurement related symbol, and wherein X1 and X2 are integers greater than or equal to 0, and wherein the CLI measurement related symbol includes at least one orthogonal frequency-division multiplexing (OFDM) symbol of a sound reference signal (SRS).

In some embodiments, the CLI measurement is a reference signal received power (RSRP) measurement or a received signal strength indicator (RSSI) measurement with respect to the involved reference signal (RS). Such the involved RS may be a sound RS (SRS) and/or other like RS.

In some embodiments, X1 and X2 are determined based at least one of the UE capability or subcarrier spacing (SCS).

In some embodiments, the UE capability indicates that the UE supports the simultaneous reception of the at least one signal associated with the CLI measurement and the at least one signal associated with the serving cell or the neighbor cell of the UE, and the method further includes receiving, during a CLI measurement window, one or more sound reference signals (SRSs) associated with the CLI measurement; performing, during the CLI measurement window, one or more measurements with respect to the one or more SRSs; and receiving, during the CLI measurement window, one or more signals associated with the serving cell or the neighbor cell of the UE.

In some embodiments, the one or more measurements include at least one of a reference signal received power (RSRP) measurement and a received signal strength indicator (RSSI) measurement with respect to the one or more SRSs.

In some embodiments, the one or more signals associated with the serving cell or the neighbor cell of the UE is at least one radio resource management (RRM) signal.

In some embodiments, the one or more signals associated with the serving cell of the UE includes at least one of a physical downlink shared channel (PDSCH) signal and a physical downlink control channel (PDCCH) signal.

In some embodiments, the UE capability indicates that the UE does not support the simultaneous reception of the at least one signal associated with the CLI measurement and the at least one signal associated with the serving cell or neighbor cell of the UE, and the method further includes: receiving, during a CLI measurement window, one or more sound reference signals (SRSs) associated with the CLI measurement; performing, during the CLI measurement window, one or more measurements with respect to the one or more SRSs; and disregarding, during the CLI measurement window, one or more signals that are associated with the serving cell or the neighbor cell of the UE and that are transmitted to the UE.

FIG. 3B is a flowchart of an example process 310 for indicating a UE capability from UE's perspective. At step 312, the process 310 involves a capability of the UE indicating whether the UE supports simultaneous cross-link interference (CLI) measurement and at least one signal associated with a serving cell or a neighbor cell of the UE. In an example, step 312 may be performed by processing circuitry of the UE. At step 314, the process 310 involves generating a message that indicates the capability of the UE. In an example, step 314 may be performed by baseband circuitry of the UE.

In some embodiments, the process 310 further involves performing the CLI measurement during a CLI measurement window.

In some embodiments, the CLI measurement window is from X1 symbols before a CLI measurement related symbol to X2 symbols after the CLI measurement related symbol, and wherein X1 and X2 are integers greater than or equal to 0, and wherein the CLI measurement related symbol includes at least one orthogonal frequency-division multiplexing (OFDM) symbol of a sound reference signal (SRS).

In some embodiments, the UE capability indicates that the UE is capable of simultaneous CLI measurement and reception of the at least one signal associated with the serving cell or the neighbor cell of the UE, and the process further involves: performing, during a CLI measurement window, one or more measurements with respect to one or more sound reference signals (SRSs) associated with the CLI measurement; and receiving, during the CLI measurement window, one or more signals associated with the serving cell or the neighbor cell of the UE.

In some embodiments, the UE capability indicates that the UE is not capable of simultaneous CLI measurement and reception of the at least one signal associated with the serving cell or the neighbor cell of the UE, and the process further involves: performing, during a CLI measurement window, one or more measurements with respect to one or more sound reference signals (SRSs) associated with the CLI measurement; and disregarding, during the CLI measurement window, one or more signals that are associated with the serving cell or the neighbor cell of the UE and that are transmitted to the UE.

FIG. 3C is a flowchart of an example process 320 for generating a message that indicates a capability of a UE. At step 322, the process 320 involves receiving from a user equipment (UE) a message that indicates a capability of the UE whether to support simultaneous cross-link interference (CLI) measurement and reception of at least one signal associated with a serving cell of the UE. At step 324, the process 320 involves determining, based on the message, whether the UE supports simultaneous CLI measurement and reception of the at least one signal associated with the serving cell of the UE.

In some embodiments, determining, based on the message, whether the UE supports simultaneous CLI measurement and reception of the at least one signal associated with the serving cell of the UE comprises determining that the UE does not support simultaneous CLI measurement and reception of the at least one signal associated with the serving cell of the UE, and the method further involves: determining that the UE is to disregard one or more signals that are associated with the serving cell and that are transmitted to the UE.

In some embodiments, the method further involves receiving from the UE a report indicative of one or more measurements with respect to one or more sound reference signals (SRSs) associated with the CLI measurement.

In some embodiments, determining, based on the message, whether the UE supports simultaneous CLI measurement and reception of the at least one signal associated with the serving cell of the UE comprises determining that the UE supports simultaneous CLI measurement and reception of the at least one signal associated with the serving cell of the UE, and the method further includes receiving from the UE a report indicative of: (i) one or more measurements with respect to one or more sound reference signals (SRSs) associated with the CLI measurement, and (ii) one or more measurements with respect to one or more signals associated with the serving cell of the UE.

In some embodiments, the one or more measurements with respect to the one or more signals associated with the serving cell of the UE are at least one of synchronization signal block (SSB) or channel state information reference signal (CSI-RS) based measurements.

In some embodiments, the one or more measurements with respect to the one or more SRSs associated with the CLI measurement include at least one of a reference signal received power (RSRP) measurement and a received signal strength indicator (RSSI) measurement with respect to the one or more SRSs.

The example processes shown in FIGS. 3A, 3B, and 3C can be modified or reconfigured to include additional, fewer, or different steps (not shown in the figures), which can be performed in the order shown or in a different order.

Figure 4:
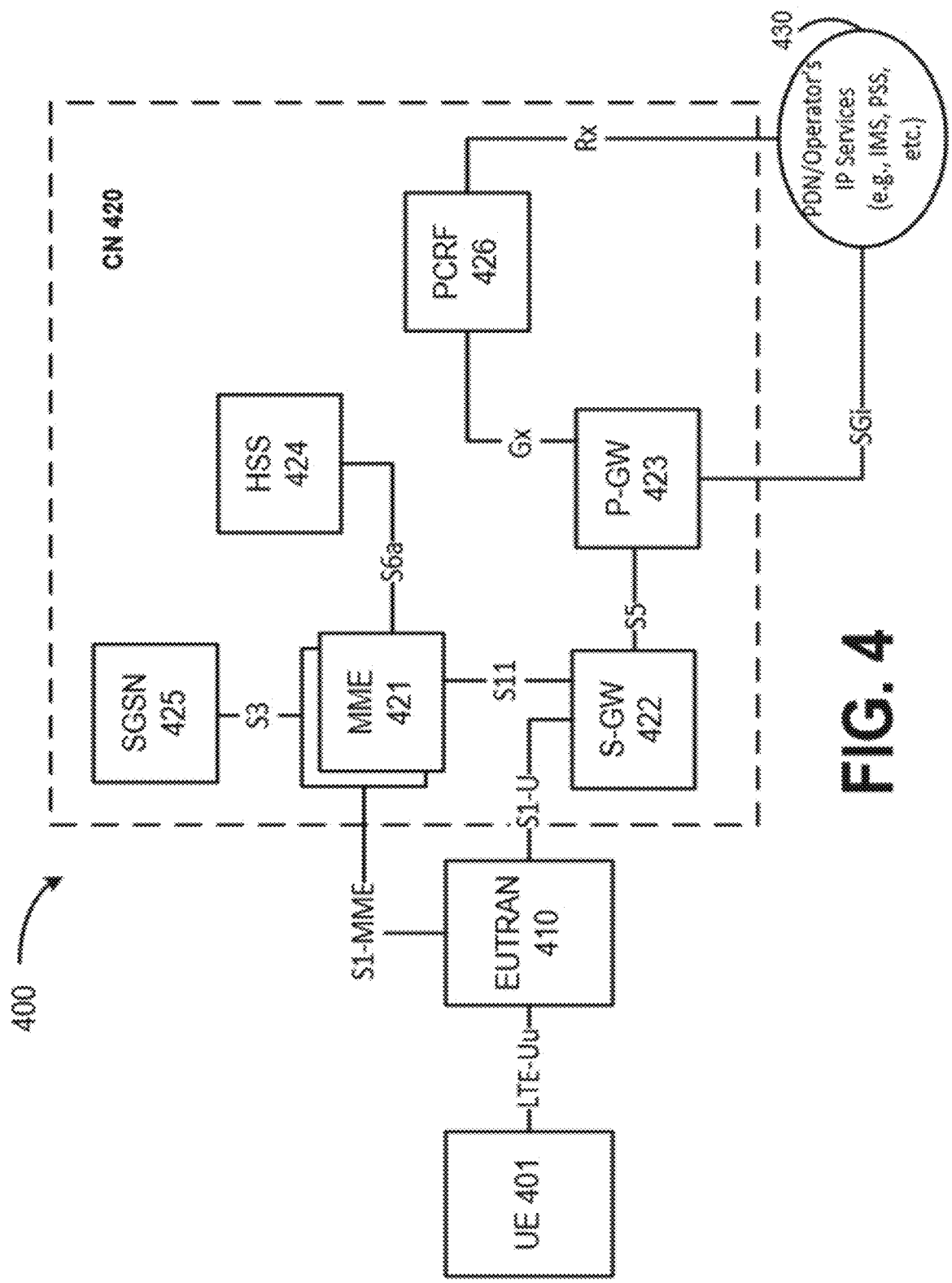
FIG. 4 illustrates an example architecture of a system including a first CN, according to some embodiments of the present disclosure.

FIG. 4 illustrates an example architecture of a system 400 including a first CN 420, in accordance with various embodiments. In this example, system 400 may implement the LTE standard wherein the CN 420 is an EPC 420 that corresponds with CN 120 of FIG. 1. Additionally, the UE 401 may be the same or similar as the UEs 101 of FIG. 1, and the E-UTRAN 410 may be a RAN that is the same or similar to the RAN 110 of FIG. 1, and which may include RAN nodes 111 discussed previously. The CN 420 may comprise MMEs 421, an S-GW 422, a P-GW 423, a HSS 424, and a SGSN 425.

The MMEs 421 may be similar in function to the control plane of legacy SGSN, and may implement MM functions to keep track of the current location of a UE 401. The MMEs 421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. That are used to maintain knowledge about a present location of the UE 401, provide user identity confidentiality, and/or perform other like services to users/subscribers. Each UE 401 and the MME 421 may include an MM or EMM sublayer, and an MM context may be established in the UE 401 and the MME 421 when an attach procedure is successfully completed. The MM context may be a data structure or database object that stores MM-related information of the UE 401. The MMEs 421 may be coupled with the HSS 424 via an S6a reference point, coupled with the SGSN 425 via an S3 reference point, and coupled with the S-GW 422 via an S11 reference point.

The SGSN 425 may be a node that serves the UE 401 by tracking the location of an individual UE 401 and performing security functions. In addition, the SGSN 425 may perform Inter-EPC node signaling for mobility between 2G/3G and E-UTRAN 3GPP access networks; PDN and S-GW selection as specified by the MMEs 421; handling of UE 401 time zone functions as specified by the MMEs 421; and MME selection for handovers to E-UTRAN 3GPP access network. The S3 reference point between the MMEs 421 and the SGSN 425 may enable user and bearer information exchange for inter-3GPP access network mobility in idle and/or active states.

The HSS 424 may comprise a database for network users, including subscription-related information to support the network entities' handling of communication sessions. The EPC 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc. An S6a reference point between the HSS 424 and the MMEs 421 may enable transfer of subscription and authentication data for authenticating/authorizing user access to the EPC 420 between HSS 424 and the MMEs 421.

The S-GW 422 may terminate the S1 interface 113 ("S1-U" in FIG. 4) toward the RAN 410, and routes data packets between the RAN 410 and the EPC 420. In addition, the S-GW 422 may be a local mobility anchor point for inter-RAN node handovers and also may provide an anchor for inter-3GPP mobility. Other responsibilities may include lawful intercept, charging, and some policy enforcement. The S11 reference point between the S-GW 422 and the MMEs 421 may provide a control plane between the MMEs 421 and the S-GW 422. The S-GW 422 may be coupled with the P-GW 423 via an S5 reference point.

The P-GW 423 may terminate an SGi interface toward a PDN 430. The P-GW 423 may route data packets between the EPC 420 and external networks such as a network including the application server 130 (alternatively referred to as an "AF") via an IP interface 125 (see e.g., FIG. 1). In embodiments, the P-GW 423 may be communicatively coupled to an application server (application server 130 of FIG. 1 or PDN 430 in FIG. 4) via an IP communications interface 125 (see, e.g., FIG. 1). The S5 reference point between the P-GW 423 and the S-GW 422 may provide user plane tunneling and tunnel management between the P-GW 423 and the S-GW 422. The S5 reference point may also be used for S-GW 422 relocation due to UE 401 mobility and if the S-GW 422 needs to connect to a non-collocated P-GW 423 for the required PDN connectivity. The P-GW 423 may further include a node for policy enforcement and charging data collection (e.g., PCEF (not shown)). Additionally, the SGi reference point between the P-GW 423 and the packet data network (PDN) 430 may be an operator external public, a private PDN, or an intra operator packet data network, for example, for provision of IMS services. The P-GW 423 may be coupled with a PCRF 426 via a Gx reference point.

PCRF 426 is the policy and charging control element of the EPC 420. In a non-roaming scenario, there may be a single PCRF 426 in the Home Public Land Mobile Network (HPLMN) associated with a UE 401's Internet Protocol Connectivity Access Network (IP-CAN) session. In a roaming scenario with local breakout of traffic, there may be two PCRFs associated with a UE 401's IP-CAN session, a Home PCRF (H-PCRF) within an HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate QoS and charging parameters. The PCRF 426 may provision this rule into a PCEF (not shown) with the appropriate TFT and QCI, which commences the QoS and charging as specified by the application server 430. The Gx reference point between the PCRF 426 and the P-GW 423 may allow for the transfer of QoS policy and charging rules from the PCRF 426 to PCEF in the P-GW 423. An Rx reference point may reside between the PDN 430 (or "AF 430") and the PCRF 426.

Figure 5B:
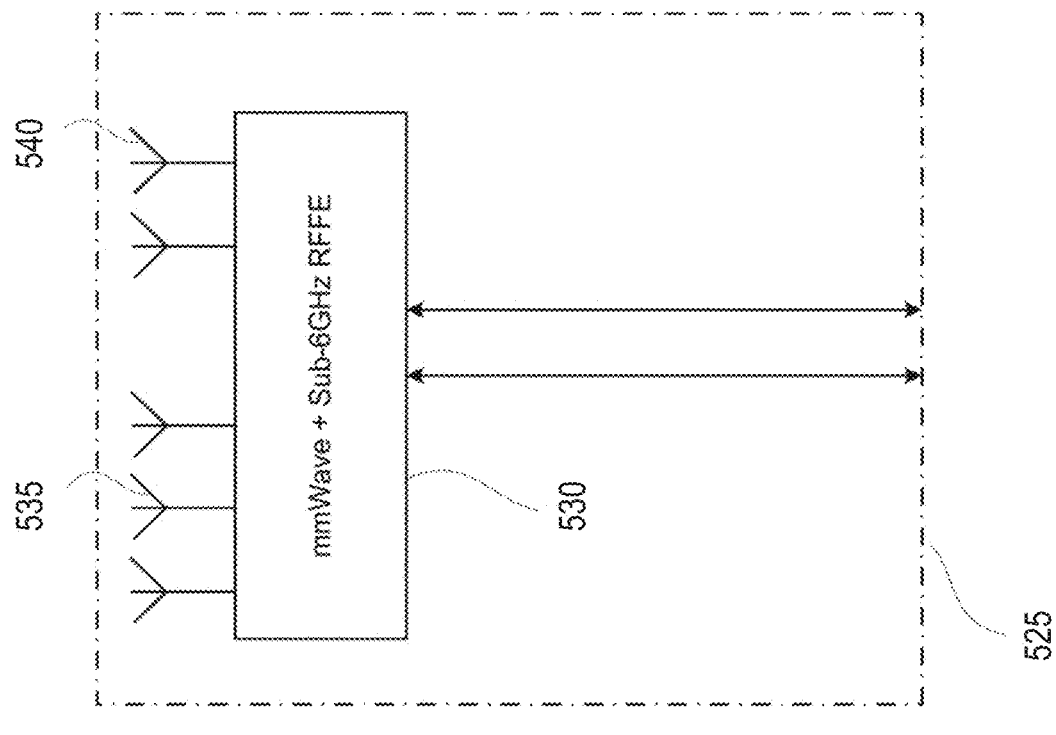
FIG. 5B illustrates an alternative RFFE, according to some embodiments of the present disclosure.
Figure 5A:
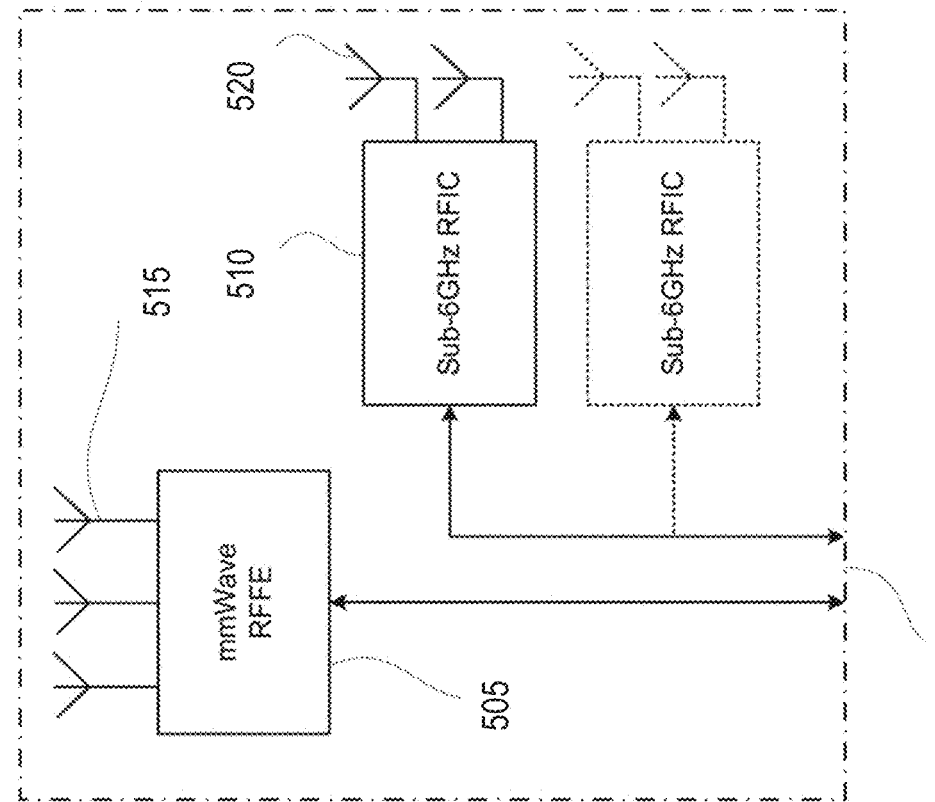
FIG. 5A illustrates an example radio frequency front end (RFFE) incorporating a millimeter Wave (mmWave) RFFE and one or more sub-millimeter wave radio frequency integrated circuits (RFICs), according to some embodiments of the present disclosure.

FIG. 5A illustrates an example radio frequency front end (RFFE) incorporating a millimeter Wave (mmWave) RFFE and one or more sub-millimeter wave radio frequency integrated circuits (RFICs). In particular, FIG. 5A illustrates an embodiment of a radio frequency front end 500 incorporating an mmWave RFFE 505 and one or more sub-6 GHz radio frequency integrated circuits (RFICs) 510. The mmWave RFFE 505 may be used for the UE 101 while operating in FR2 or mmWave; the RFICs 510 may be used for the UE 101 while operating in FR1, sub-6 GHz, or LTE bands. In this embodiment, the one or more RFICs 510 may be physically separated from the mmWave RFFE 505. RFICs 510 may include connection to one or more antennas 520. The RFFE 505 may be coupled with multiple antennas 515, which may constitute one or more antenna panels.

FIG. 5B illustrates an alternate embodiment of an RFFE 525. In this aspect both millimeter wave and sub-6 GHz radio functions may be implemented in the same physical RFFE 530. The RFFE 530 may incorporate both millimeter wave antennas 535 and sub-6 GHz antennas 540.

FIGS. 5A and 5B illustrate embodiments of various RFFE architectures for either the UE 202 or the AN 204.

In NR-involved communications, an AN associated with a cell may utilize beamforming techniques to form transmit beams when transmitting signals to facilitate directional transmission to a UE at a particular location. This may be especially useful when operating at mmWave frequencies. The transmit beams with respect to a cell with certain direction may provide the UE of a particular location with a stronger signal than other UEs of other locations. This may enable a better wireless connection between the UE and the AN associated with the cell. Multiple transmit beams from a cell may be formed by an antenna panel of the AN associated with the cell. For example, a maximum of 64 transmit beams may be formed with different transmit-beam configurations from a cell. Such transmit-beam configurations may utilize beamforming technology implemented by one or more antenna panels. Then, the transmit beams may be received and measured by the UE. In some embodiments, the UE may further form one or more receive beams while receiving. Thus, non-data measurements for cell searching and measurements are beam-dependent.

Figure 6:
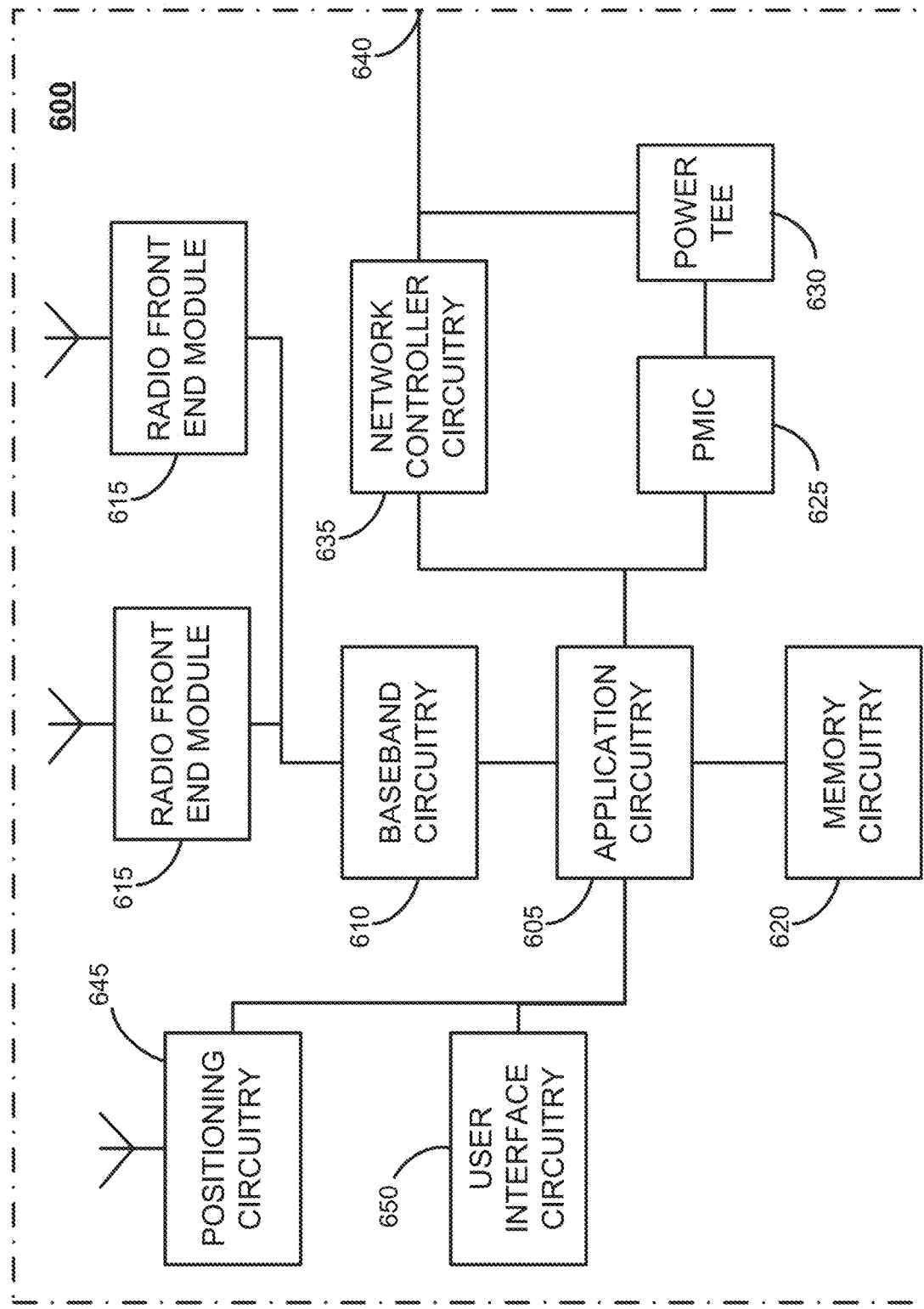
FIG. 6 illustrates an example of infrastructure equipment, according to some embodiments of the present disclosure.

FIG. 6 illustrates an example of infrastructure equipment 600 in accordance with various embodiments. The infrastructure equipment 600 (or "system 600") may be implemented as a base station, radio head, RAN node such as the RAN nodes 111 and/or AP 106 shown and described previously, application server(s) 130, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like embodiments.

Application circuitry 605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some embodiments, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some embodiments, the system 600 may not utilize application circuitry 605, and instead may include a special-purpose processor/controller to process IP data received from an EPC or 5GC, for example.

In some embodiments, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. Of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 7.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some embodiments, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative embodiments, both mmWave and sub-mmWave radio functions may be implemented in the same physical RFEM 615, which incorporates both mmWave antennas and sub-mmWave.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some embodiments, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 111, etc.), or the like.

The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 7:
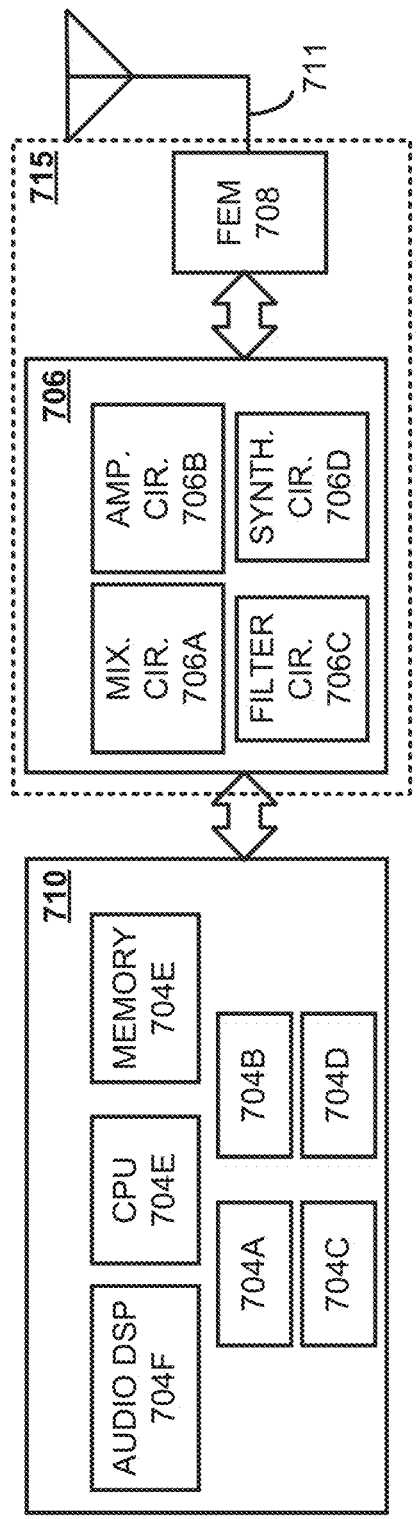
FIG. 7 illustrates example components of baseband circuitry and radio front end modules (RFEM), according to some embodiments of the present disclosure.

FIG. 7 illustrates example components of baseband circuitry 710 and radio front end modules (RFEM) 715 in accordance with various embodiments. The baseband circuitry 710 corresponds to the baseband circuitry 610 of FIG. 6. The RFEM 715 corresponds to the RFEM 615 of FIG. 6. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 605 (see FIG. 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 605 of FIG. 6-7); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. To facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 710 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* of the transmit signal path may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider.

The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 605 depending on the desired output frequency. In some embodiments, a divider control input (e.g., N) may be determined from a look-up table based on a channel indicated by the application circuitry 605.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 605 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 605 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 8:
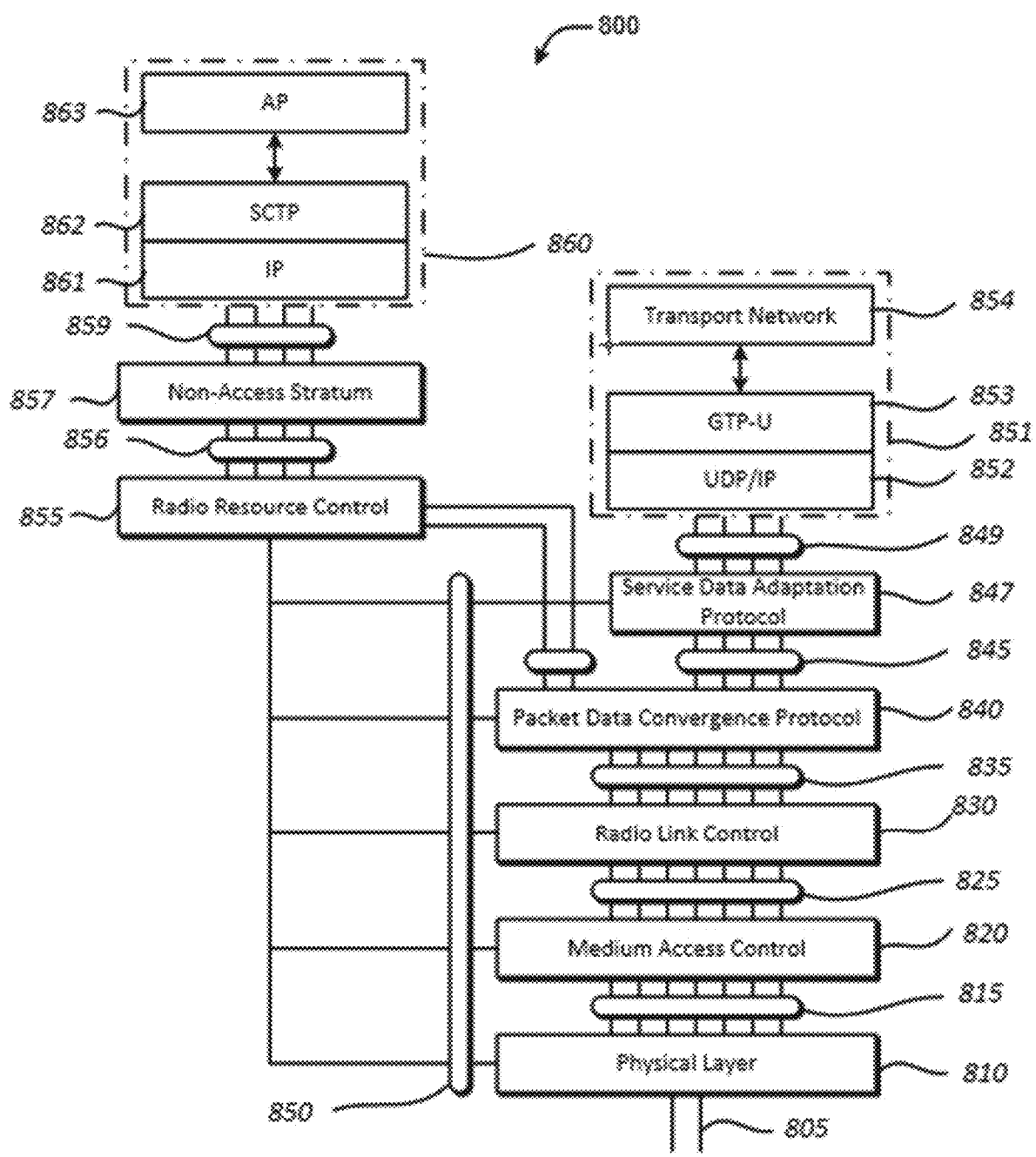
FIG. 8 illustrates various protocol functions that may be implemented in a wireless communication device, according to some embodiments of the present disclosure.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and/or LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 510 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR embodiments and may not be used in LTE embodiments.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 857 may form the highest stratum of the control plane between the UE 101 and the AMF 521. The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 111, AMF 521 in NR embodiments or MME 421 in LTE embodiments, UPF 502 in NR embodiments or S-GW 422 and P-GW 423 in LTE embodiments, or the like to be used for control plane or user plane communications protocol stack between the aforementioned devices. In such embodiments, one or more protocol entities that may be implemented in one or more of UE 101, gNB 111, AMF 521, etc. May communicate with a respective peer protocol entity that may be implemented in or on another device using the services of respective lower layer protocol entities to perform such communication. In some embodiments, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR embodiments, the AP 863 may be an NG application protocol layer (NGAP or NG-AP) 863 for the NG interface 113 defined between the NG-RAN node 111 and the AMF 521, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise Elementary Procedures (EPs). An NG-AP EP may be a unit of interaction between the NG-RAN node 111 and the AMF 521. The NG-AP 863 services may comprise two groups: UE-associated services (e.g., services related to a UE 101) and non-UE-associated services (e.g., services related to the whole NG interface instance between the NG-RAN node 111 and AMF 521). These services may include functions including, but not limited to: a paging function for the sending of paging requests to NG-RAN nodes 111 involved in a particular paging area; a UE context management function for allowing the AMF 521 to establish, modify, and/or release a UE context in the AMF 521 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 521; a NAS node selection function for determining an association between the AMF 521 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE embodiments, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 111 and an MME 421 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR embodiments, or S1-AP or X2AP messages in LTE embodiments). The SCTP 862 may ensure reliable delivery of signaling messages between the RAN node 111 and the AMF 521/MME 421 based, in part, on the IP protocol, supported by the IP 861. The Internet Protocol layer (IP) 861 may be used to perform packet addressing and routing functionality. In some embodiments the IP layer 861 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 101, the RAN node 111, and UPF 502 in NR embodiments or an S-GW 422 and P-GW 423 in LTE embodiments. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 422 may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 422 and the P-GW 423 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 423.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 605. The application layer may also provide one or more interfaces for software applications to interact with communications systems of the UE 101 or RAN node 111, such as the baseband circuitry 710. In some embodiments the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
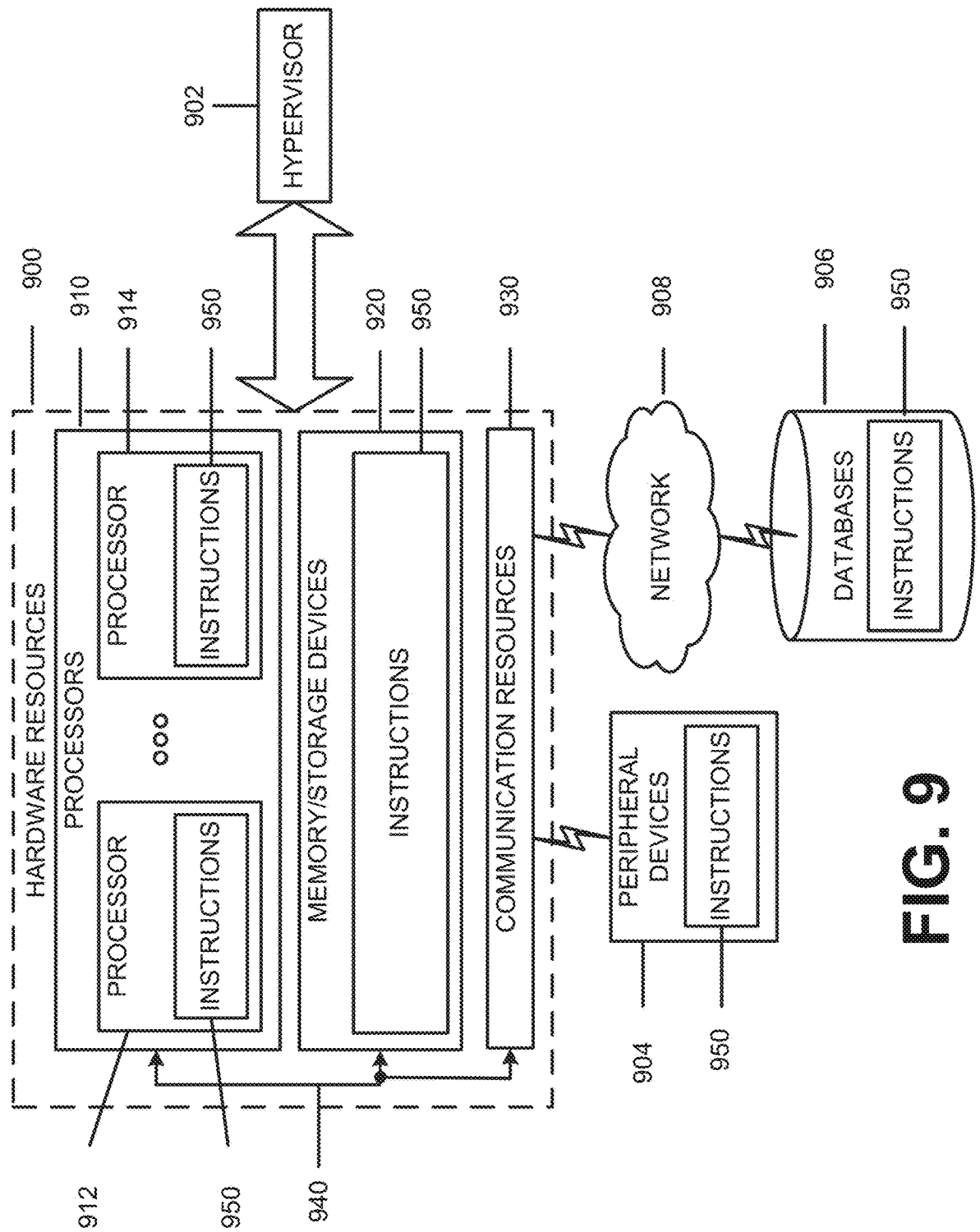
FIG. 9 is a block diagram illustrating components, according to some embodiments of the present disclosure.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
    determining a capability restriction of a user equipment (UE) to simultaneously perform cross-link interference (CLI) measurement and receive at least one of a physical downlink shared channel (PDSCH) signal or a physical downlink control channel (PDCCH) signal from a serving cell of the UE; and
    based at least on the capability restriction, restricting reception of one or more of PDCCH, PDSCH or channel state information reference signal (CSI-RS) within a CLI measurement window comprising orthogonal frequency-division multiplexing (OFDM) symbols on which the UE performs sounding reference signal (SRS) reference signal received power (RSRP) measurements and 1 data symbol before an OFDM symbol used for SRS-RSRP measurements for 15 kiloHertz (kHz) and 30 kHz subcarrier spacing.

2. The method of claim 1, wherein the at least one of the PDSCH signal or the PDCCH signal is received from the serving cell of the UE, and the CLI is measured from a cell other than the serving cell of the UE.

3. The method of claim 1, wherein the CLI measurement is associated with one or more uplink signals from another UE.

4. The method of claim 3, wherein the one or more uplink signals comprise a sounding reference signal (SRS).

5. The method of claim 3, wherein the CLI measurement comprises at least one of:
    a measurement of reference signal received power (RSRP) of the one or more uplink signals, or a measurement of received signal strength indicator (RSSI) of the one or more uplink signals.

6. The method of claim 1, wherein the CLI measurement is performed differently for a first frequency range and for a second frequency range.

7. The method of claim 6, further comprising:
    using one or more re sub-millimeter wave radio frequency integrated circuits (RFICs) for CLI measurement in the first frequency range, and
    using one or more millimeter Wave frequency front ends (RFFEs) for CLI measurement in the second frequency range.

8. The method of claim 1, wherein the CLI measurement window comprises 2 data symbols before an OFDM symbol used for SRS-RSRP measurements for 60 kHz subcarrier spacing.

9. An apparatus, comprising:
    a processor that is configured to:
        determine a capability restriction of a user equipment (UE) to simultaneously perform cross-link interference (CLI) measurement and receive at least one of a physical downlink shared channel (PDSCH) signal or a physical downlink control channel (PDCCH) signal from a serving cell of the UE; and
        based at least on the capability restriction, restrict reception of one or more of PDCCH, PDSCH or channel state information reference signal (CSI-RS) within a CLI measurement window comprising orthogonal frequency-division multiplexing (OFDM) symbols on which the UE performs sounding reference signal (SRS) reference signal received power (RSRP) measurements and 1 data symbol before an OFDM symbol used for SRS-RSRP measurements for 15 kiloHertz (kHz) and 30 kHz subcarrier spacing.

10. The apparatus of claim 9, wherein the at least one of the PDSCH signal or the PDCCH signal is received from the serving cell of the UE and the CLI is measured from a cell other than the serving cell of the UE.

11. The apparatus of claim 9, wherein the CLI measurement is associated with one or more uplink signals from another UE.

12. The apparatus of claim 11, wherein the one or more uplink signals comprise a sounding reference signal (SRS).

13. The apparatus of claim 11, wherein the CLI measurement comprises at least one of:
    a measurement of a reference signal received power (RSRP) of the one or more uplink signals, or
    a measurement of a received signal strength indicator (RSSI) of the one or more uplink signals.

14. The apparatus of claim 9, wherein the CLI measurement is performed differently for a first frequency range and for a second frequency range.

15. One or more processors comprising circuitry that executes instructions to perform operations comprising:
    determining a capability restriction of a user equipment (UE) to simultaneously perform cross-link interference (CLI) measurement and receive at least one of a physical downlink shared channel (PDSCH) signal or a physical downlink control channel (PDCCH) signal from a serving cell of the UE; and
    based at least on the capability restriction, restricting reception of one or more of PDCCH, PDSCH or channel state information reference signal (CSI-RS) within a CLI measurement window comprising orthogonal frequency-division multiplexing (OFDM) symbols on which the UE performs sounding reference signal (SRS) reference signal received power (RSRP) measurements and 1 data symbol before an OFDM symbol used for SRS-RSRP measurements for 15 kiloHertz (kHz) and 30 kHz subcarrier spacing.

16. The one or more processors of claim 15, wherein the at least one of the PDSCH signal or the PDCCH signal is received from the serving cell of the UE and the CLI is measured from a cell other than the serving cell of the UE.

17. The one or more processors of claim 15, wherein the CLI measurement is associated with one or more uplink signals from another UE.

18. The one or more processors of claim 17, wherein the one or more uplink signals comprise a sounding reference signal (SRS).

19. The one or more processors of claim 17, wherein the CLI measurement comprises at least one of:
    a measurement of reference signal received power (RSRP) of the one or more uplink signals, or
    a measurement of received signal strength indicator (RSSI) of the one or more uplink signals.

20. The one or more processors of claim 15, wherein the CLI measurement is performed differently for a first frequency range and for a second frequency range.

21. A method, comprising:
    receiving, by an access node (AN) and from a user equipment (UE), a signal indicating that the UE has a capability restriction to simultaneously perform cross-link interference (CLI) measurement and receive at least one of a physical downlink shared channel (PDSCH) signal or a physical downlink control channel (PDCCH) signal from a serving cell of the UE; and
    transmitting at least one of the PDSCH signal or the PDCCH signal to the UE,
    wherein, based at least on the capability restriction, the UE restricts reception of one or more of the PDCCH signal, the PDSCH signal, or channel state information reference signal (CSI-RS), within a CLI measurement window comprising orthogonal frequency-division multiplexing (OFDM) symbols on which the UE performs sounding reference signal (SRS) reference signal received power (RSRP) measurements and 1 data symbol before an OFDM symbol used for SRS-RSRP measurements for 15 kiloHertz (kHz) and 30 kHz subcarrier spacing.

22. The method of claim 21, wherein the at least one of the PDSCH signal or the PDCCH signal is transmitted via the serving cell of the UE, and the CLI is measured from a cell other than the serving cell of the UE.

23. The method of claim 21, wherein the CLI measurement is associated with one or more uplink signals from another UE, and wherein the one or more uplink signals comprise a sounding reference signal (SRS).

24. The method of claim 21, wherein the CLI measurement is associated with one or more uplink signals from another UE and wherein the CLI measurement comprises at least one of:
    a measurement of reference signal received power (RSRP) of the one or more uplink signals, or
    a measurement of received signal strength indicator (RSSI) of the one or more uplink signals.

25. The method of claim 21, wherein the CLI measurement is performed differently for a first frequency range and for a second frequency range.

* * * * *

UNITED STATES PATENT AND TRADEMARK OFFICE
CERTIFICATE OF CORRECTION

PATENT NO. : 12,238,564 B2
APPLICATION NO. : 18/369097
DATED : February 25, 2025
INVENTOR(S) : Qiming Li et al.

Page 1 of 1

It is certified that error appears in the above-identified patent and that said Letters Patent is hereby corrected as shown below:

In the Claims

Column 36, Line 12, In Claim 24, after "of" insert -- claim --.

Signed and Sealed this
Fifteenth Day of April, 2025

Coke Morgan Stewart
*Acting Director of the United States Patent and Trademark Office*